Figure 1:
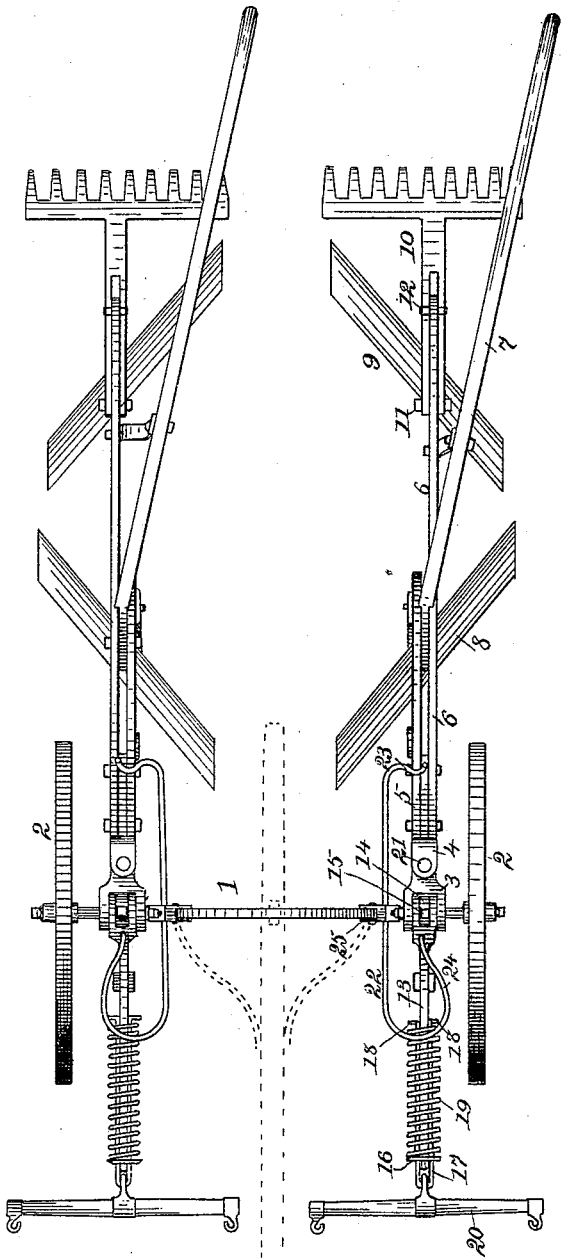

(No Model.) 2 Sheets—Sheet 1.

R. BUTT & D. H. HIGH.
CULTIVATOR.

No. 538,655. Patented May 7, 1895.

Attest.
Nora Graham.
Ina Graham.

Inventors
Revere Butt and
David H. High
by L. P. Graham attorney

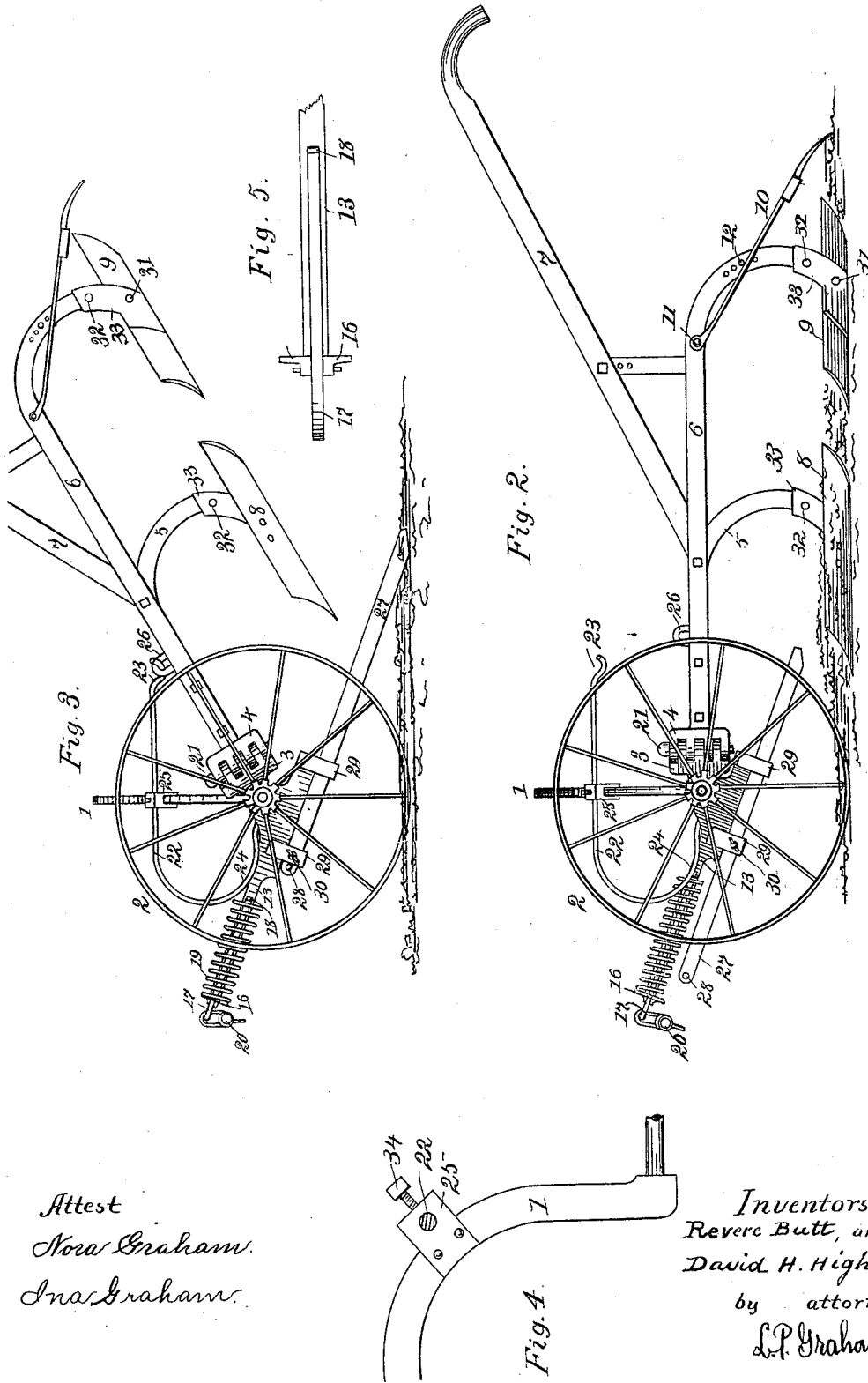

UNITED STATES PATENT OFFICE.

REVERE BUTT AND DAVID H. HIGH, OF DECATUR, ILLINOIS.

CULTIVATOR.

SPECIFICATION forming part of Letters Patent No. 538,655, dated May 7, 1895.

Application filed December 17, 1894. Serial No. 531,999. (No model.)

*To all whom it may concern:*

Be it known that we, REVERE BUTT and DAVID H. HIGH, of Decatur, in the county of Macon and State of Illinois, have invented certain new and useful Improvements in Cultivators, of which the following is a specification.

This invention relates to straddle-row cultivators. It is particularly applicable to surface cultivation, it is exemplified in the structure hereinafter described, and it is defined in the appended claims.

In the drawings forming part of this specification, Figure 1 is a plan of a cultivator embodying our improvements. Fig. 2 is a side elevation showing the cultivator-blades in operative position. Fig. 3 is a similar view showing the blades held out of contact with the ground. Fig. 4 is a front elevation of a part of the arch, showing a clip used to hold one of the bars that support the beams in the position shown in Fig. 3 and also hold the arch upright. Fig. 5 is a detail representation of some of the elements of the spring-hitch with which the draft-bars are provided.

The arch is shown at 1 and the wheels at 2. Between the wheels and the arch are horizontal extensions in line with the wheel spindles, and on each of these extensions is journaled a bracket 3. A bracket 4 is connected with bracket 3 by means of a vertical pivot pin, 21, and the joint between the two brackets is a close fitting knuckle joint adapted to hold the beam against twisting motion and relieve the pivot pin of a part of the strain and consequent wear. The number of members in the knuckle joint may be varied at will. A short beam-bar 5 and a long beam-bar 6 are fastened to bracket 4, extend rearward therefrom, and bend downward at their rear ends to form shanks for blades 8 and 9 respectively. The shoes 33 provide means for connecting the blades with the shanks, 31 indicating securing bolts and 32 break pins. The blades are sharpened on both edges and are secured to the shoes in a manner permitting removal and reversal of position. Their arrangement is such that one blade of each beam is behind the other, both are set obliquely to the line of draft, and the direction of the inclination of one is contrary to the inclination of the other. This causes the side draft tendency of one to neutralize the side draft of the other, thereby attaining a draw cut action in the blades without the necessity of fastening the rear ends of the beams together, and, in addition, submitting the soil to two cultivating operations at different inclinations. The blades are preferably set in such manner that the front ones will throw from and the rear ones toward the row; as shown in the drawings.

The drag-bar 10 is preferably elastic. It is provided at its rear end with a toothed evener, and it is hinged to the bar 6 of the beam at 11. A set of holes are formed in the shank adjacent to the drag-bar, and a break pin 12 is placed in the hole that is in position to compel the bar to assume the desired relation to the ground, when the bar is below the pin. The bar will spring to ride over ordinary obstructions, and the pin will break when the strain becomes so strong as to endanger the machine. The drag acts to level and pulverize the soil after it has been subjected to the action of the blades. A handle, as 7, is secured to each of the beams, and provides means for guiding the blades and the drags.

A draft bar 13 is swung on each horizontal extension of the arch, is preferably placed between members of bracket 3, and a collar 14, provided with a set screw 15, is employed to hold both the draft bar and the beam bracket in any desired position on the horizontal extension. The end of each draft bar is provided with a spring hitch which is preferably composed of the head 16, fastened onto the end of the draft bar by a pin or otherwise, the loop bar 17 embracing the draft bar lengthwise and having the out-turned ends 18, and the coiled compression spring encircling the draft bar and the loop bar, between the head of one and the out-turned ends of the other. The single trees 20 are connected with the loop bars as shown, or in any desired manner.

In addition to the ordinary function of a spring hitch, or buffer, the springs act as draft equalizers to some extent, permitting one horse to move temporarily in advance of the other without disturbing the proper co-relation of the cultivating devices.

A slide bar 27 is held in guide blocks 29, which are fastened to the draft bar, and is provided with a stop pin 28 at its forward end. A set screw 30, in one of the guide blocks, provides means for holding the bar from sliding in the blocks. When the cultivator is in operation the slide bars are held in the position shown in Fig. 2, and when it is desired to hold the beams raised, as shown in Fig. 3, the set screws are loosened and the bars moved lengthwise in the blocks until the pins 28 strike the upper block and the opposite ends of the bars are in contact with the ground. The weight of the rear ends of the beams, together with the blades, &c., is then supported, indirectly, by the rear ends of the bars, which slide along the ground as the cultivator moves forward.

A clip 25 is secured to each side of the arch, somewhat as shown in Fig. 4. A rod 22 extends through each clip and is held therein by a set screw, as 34. The front end of the rod bends downward, as shown at 24, and connects with the draft bar, and the rear end has the hooked termination 23, which engages the loop 26 of the beam, and holds the beam elevated. The part of the rod that connects with the draft bar holds the arch upright when the draft bar is in operative position, and, at the same time, permits the position of the draft bar and beam to be shifted on the horizontal extension of the arch, for the purpose of increasing or diminishing the space between the beams, and getting the cultivating blades nearer to or farther from the row.

The cultivating mechanism on one side of the arch is the same as that on the other, the arrangement being that commonly known as rights and lefts, and the description of one applies equally well to the other.

The device as a whole constitutes a tongueless cultivator, but the cultivating devices proper, that is, the beams, blades, eveners and handles, may be used with a tongue, as indicated in dotted lines in Fig. 1, and in that case the described hitch and draft bar may be used, or any known form of connection may be substituted therefor.

The utility of the device resides in the peculiar arrangement of cultivating blades, whereby draw-cut action is obtained without side swing in the beams, and the soil is subjected to unusually thorough cultivation by the blades and the drags. It also resides in the provision for holding the arch upright while permitting sidewise adjustment of the beams, for sustaining the beams, and for evening the draft while furnishing an elastic buffer, or spring hitch.

Having thus described our invention, we claim as new and desire to secure by Letters Patent—

1. A cultivator, the beams whereof are each supplied with two cutting blades inclined in opposite directions and placed one directly in front of the other, substantially as set forth.

2. A cultivator, the beams whereof are each supplied with two cutting blades inclined in opposite directions and placed one directly in front of the other, and are also supplied with leveling drags located in the rear of the blades, substantially as set forth.

3. In a cultivator, the combination with the beams thereof, of drags swung from the beams and held in operative positions by break pins, substantially as set forth.

4. In a cultivator, the combination with the beams thereof, of elastic drag bars swung from the beams and held in operative positions by break pins, substantially as set forth.

5. In a cultivator, the combination of an arch, draft bars journaled on horizontal extensions of the arch, and a loop-formed rod connecting each draft bar with the arch, substantially as set forth.

6. In a cultivator, the combination of an arch, draft bars journaled on horizontal extensions of the arch, cultivator beams similarly connected, and loop-formed rods connecting the draft bars with the arch and extending rearward from the arch to form supports for the beams, substantially as set forth.

7. In a cultivator, the combination of draft bars having heads, loop bars embracing the draft bars lengthwise and having their ends turned outward, and coiled compression springs encircling the draft bars and loop bars between the head of the one and the outturned ends of the other, substantially as set forth.

In testimony whereof we sign our names in the presence of two subscribing witnesses.

REVERE BUTT.
DAVID H. HIGH.

Attest:
Thos. A. Bone,
L. P. Graham.